United States Patent [19]

Fagerburg et al.

[11] Patent Number: 5,480,926
[45] Date of Patent: Jan. 2, 1996

[54] BLENDS OF ULTRAVIOLET ABSORBERS AND POLYESTERS

[75] Inventors: David R. Fagerburg, Kingsport; Michael E. Donelson, Gray, both of Tenn.

[73] Assignee: Eastman Chemical Company, Kingsport, Tenn.

[21] Appl. No.: 430,662

[22] Filed: Apr. 28, 1995

[51] Int. Cl.$^6$ ........................................ C08K 5/34
[52] U.S. Cl. ............................ 524/86; 528/272; 528/274; 528/307; 525/437; 524/87; 524/89; 524/102; 524/105; 428/480
[58] Field of Search ........................ 528/272, 274, 528/307; 525/437; 524/86, 87, 89, 102, 105; 428/480

[56] References Cited

U.S. PATENT DOCUMENTS

| | | | |
|---|---|---|---|
| 4,291,152 | 9/1981 | Inata et al. | 528/289 |
| 4,446,262 | 5/1984 | Okumura et al. | 524/89 |
| 4,954,541 | 9/1990 | Nakane et al. | 524/86 |
| 5,079,284 | 1/1992 | Nakane et al. | 524/97 |
| 5,139,885 | 8/1992 | Nakane et al. | 428/378 |
| 5,234,681 | 8/1993 | Yoshida et al. | 424/59 |
| 5,251,064 | 10/1993 | Tennant et al. | 359/361 |
| 5,264,539 | 11/1993 | Shepherd | 528/272 |

*Primary Examiner*—Samuel A. Acquah
*Attorney, Agent, or Firm*—Betty J. Boshears; Harry J. Gwinnell

[57] ABSTRACT

This invention relates to a photo-stabilized polymer blend comprising:

(a) at least one polyethylene terephthalate-based (PET) copolymer comprising 1,4-cyclohexanedimethanol, and (b) an ultraviolet absorber, at least one compound selected from the group consisting of cyclic imino esters.

18 Claims, No Drawings

BLENDS OF ULTRAVIOLET ABSORBERS AND POLYESTERS

FIELD OF THE INVENTION

This invention relates to blends of ultraviolet absorbers and certain polyesters used in connection with sheets, film or other articles in order to protect them from sunlight or other ultraviolet (UV) light sources.

BACKGROUND OF THE INVENTION

It is well known in the art that polyesters are generally not very stable to the effects of UV radiation. This can be seen by the hazing, property loss, yellowing, etc. that are observed when a polyester is exposed to sunlight, fluorescent lights at short distances for long times, etc. This lack of property stability of polyesters upon exposure to UV light has long limited the uses of polyesters particularly in an outdoor environment.

It is also well known in the art to retard the loss of properties or particularly the development of yellow coloration in exposed articles by addition of a UV absorbing compound (sometimes erroneously called a UV stabilizer) with an extinction coefficient much higher than that of the polymer in question such that almost all of the incident UV radiation is absorbed by said compound rather than the polymer to be stabilized. When the energy absorbed by the UV absorbing compound is harmlessly decayed to the matrix as heat and not transferred electronically to the polymer chain, fragmentation of the chain is thereby suppressed and the properties can be retained for a longer time of exposure. Many such UV absorbing compounds have been developed over many decades of research in this area. It is also well known that many of these compounds are very specific to the polymer systems they are used in.

DE 2,853,631 A1 discloses that copolyesters of polyethylene terephthalate modified with 1,4-cyclohexanedimethanol (CHDM) are desirable for outdoor use but with a low CHDM content they cannot be adequately stabilized by a benzotriazole compound. A later patent, EP 0,595,413 A1 discloses the use of preferably a benzotriazole or a benzophenone compound to unexpectedly enhance the weathering stability of a sheet made from polyethylene terephthalate modified with from 5 to 30 mol % of CHDM. This patent also states that levels as low as 0.5 weight % of the UV absorbing compound may be used for adequate control of color development in the copolyester sheeting.

Certain benzoxazinone compounds are disclosed as ultraviolet absorbers in U.S. Pat. No. 4,446,262. In this patent, the disclosed benzoxazinones are said to be capable of melt mixing with various polymers. Specifically mentioned thermoplastic polymer classes are polyesters, polyamides, polycarbonates, polyolefins, polyesters and polysulfones. Specifically mentioned polyesters are polyethylene terephthalate, polytetramethylene terephthalate and polyethylene 2,6-naphthalate. These are stated to be optionally copolymerized with trifunctional or higher functional comonomers but no mention of coglycols is made for these materials.

The benzoxazinone compounds disclosed in U.S. Pat. No. 4,446,262 are also disclosed in U.S. Pat. No. 5,251,064 as being useful in a reflecting structure consisting of a metalized polyester layer of the same polyesters as disclosed in U.S. Pat. No. 4,446,262. The preferred polyester in U.S. Pat. No. 5,251,064 is stated to be polyethylene terephthalate.

Other UV absorbers that would result from the substitution of various functional groups onto the aromatic ring(s) of the benzoxazinone system are broadly mentioned in U.S. Pat. No. 4,446,262, and more specifically, in U.S. Pat. No. 5,264,539. In U.S. Pat. No. 5,264,539, for example, an oligomer containing benzoxazinone units is blended with a polyester.

SUMMARY OF THE INVENTION

This invention relates to the combination of a certain class of IV absorbing compounds at specific levels in conjunction with copolyesters of polyethylene terephthalate modified with a specified range of the amount of 1,4-cyclohexanedimethanol (CHDM).

Particularly, this invention relates to a photo-stabilized polymer blend comprising:

(a) at least one polyethylene terephthalate-based (PET) copolymer comprising 1,4-cyclohexanedimethanol, and (b) an ultraviolet absorber comprising at least one compound selected from the group consisting of cyclic imino esters represented by the following formula (I)

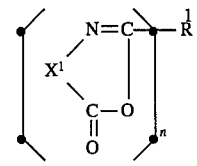

wherein $X^1$ represents 1,2-phenylene, 1,2-naphthylene, 2,3-naphthylene, a group represented by the formula (a)

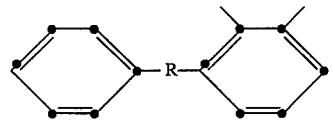

wherein R is —O—, —CO—, —S—, —SO$_2$—, —CH$_2$—, —(CH$_2$)$_2$— or —C(CH$_3$)$_2$—, or a group represented by the formula (b)

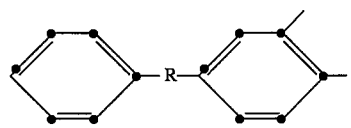

wherein R is as defined above for formula (a), and n is 1, 2 or 3 for formula (I) and $R^1$ represents a hydrocarbon residue having a valence of n.

This invention produces an unexpected benefit in retention of physical properties, particularly impact resistance, over that of the prior art.

DETAILED DESCRIPTION OF THE PREFERRED EMBODIMENTS

The objects and advantages of this invention are achieved in accordance with this invention by a photo-stabilized polymer composition comprising a polymer and an ultra-violet absorber, at least one compound selected from imino esters of the following formula (I)

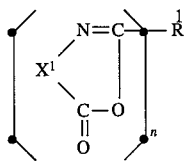

wherein $X^1$ represents a divalent aromatic residue in which the two bonds from $X^1$ are at the 1- and 2- positions; n is 1, 2 or 3; and $R^1$ represents a hydrocarbon residue having a valence of n which may further contain a hetero atom, or $R^1$ may be a direct bond when n is 2, in the unreacted state.

Many of the cyclic imino esters of formula (I) are known as molecular chain bonding agents for hydroxyl-terminated aromatic polyesters (U.S. Pat. No. 4,291,152). Some compounds of formula I in which $R^1$ is phenyl or substituted phenyl, $X^1$ is o-phenylene and n is 1, and a synthesizing method therefor are known (for example, Chemical Abstracts, Vol. 65, 1966, 15371d). These references are incorporated herein in regards to the compound of formula (I) and synthesizing methods therefor.

In general formula (I), $X^1$ is a divalent aromatic residue in which two bonds from $X^1$ are at the 1- and 2- positions; n is 2, and $R^1$ is a hydrocarbon residue having a valence of n which may further contain a hetero atom, or $R^1$ may be a direct bond.

Preferred examples of $X^1$ include 1,2-phenylene, 1,2-naphthylene, 2,3-naphthylene, and groups represented by formulas (a) and (b), wherein formula (a) is:

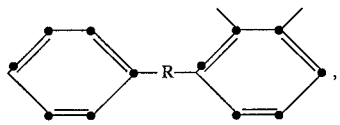

and formula (b) is

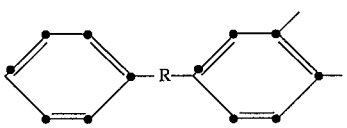

wherein R for formulas (a) and (b) is —O—, —CO—, —S—, —SO$_2$—, —CH$_2$—, —(CH$_2$)$_2$ or —C(CH$_3$)$_2$—.

Of these, 1,2-phenylene is preferred.

The aromatic residue for $X^1$ exemplified above may be substituted by substituents, for example, alkyl groups having 1 to 10 carbon atoms, such as methyl, ethyl, propyl, hexyl and decyl; aryl groups 6 to 12 carbon atoms such as phenyl and naphthyl; cycloalkyl groups having 5 to 12 carbon atoms such as cyclopentyl and cyclohexyl; aralkyl groups having 8 to 20 carbon atoms such as phenethyl; alkoxy groups having 1 to 10 carbon atoms such as methoxy, ethoxy and decyloxy; nitro; halogens such as chlorine and bromine; and acyl groups having 2 to 10 carbon atoms such as acetyl, propionyl, benzoyl and decanoyl.

$R^1$ is a hydrocarbon residue having a valence of n=2 or it may be a direct bond.

The divalent hydrocarbon residue (n=2) firstly includes, for example, unsubstituted aliphatic residues having 2 to 10 carbon atoms, unsubstituted aromatic residues having 6 to 12 carbon atoms, and unsubstituted alicyclic residues having 5 to 12 carbon atoms. Examples of the unsubstituted aliphatic residues having 2 to 10 carbon atoms are ethylene, trimethylene, tetramethylene and decamethylene. Examples of the unsubstituted aromatic residues having 6 to 12 carbon atoms are phenylene, naphthylene and p,p'-biphenylene. Examples of the unsubstituted alicyclic residues having 5 to 12 carbon atoms include cyclopentene and cyclohexylene.

Secondly, examples of the divalent hydrocarbon residue include groups represented by the following formula (g)

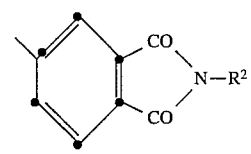

wherein $R^2$ is any one of the groups of formulas (c)–(f) and (h) defined below, a group of the formula (c)

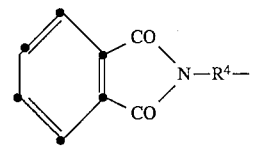

wherein $R^4$ represents an alkylene of 2 to 10 carbon atoms, phenylene or naphthylene, a group of the formula (d)

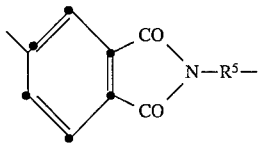

wherein $R^5$ represents an alkyl having 1 to 10 carbon atoms, a phenyl or a naphthyl, a group of the formula (e)

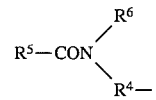

wherein $R^4$ and $R^5$ are as defined above, and $R^6$ is hydrogen atom or any one of the groups defined for $R^5$, and a group represented by the formula (f)

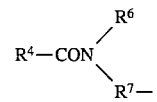

wherein $R^4$ and $R^6$ are as defined above, and $R^7$ is hydrogen atom or any one of the groups defined for $R^5$, and substituted aliphatic or aromatic residues of the following formula (h)

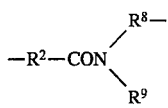

wherein $R^2$ is as defined, $R^8$ is any one of the groups defined for $R^4$, and $R^9$ is any one of the groups defined for $R^6$.

Thirdly, examples of the divalent hydrocarbon residue include substitution products of the above-mentioned unsubstituted divalent aromatic residues, which have the same substituents as exemplified hereinabove for the aromatic groups $X^1$.

When n is 2, $R^1$ is preferably a direct bond or any one of the unsubstituted or substituted aromatic hydrocarbon residues in the first to third groups. Those unsubstituted or substituted aromatic hydrocarbon residues in the first or third group in which the two bonds extend from positions farthest from each other, above all p-phenylene, p,p'-biphenylene, and 2,6-naphthylene, are especially preferred.

Representative compounds of Formula (I) where n is 2 are:
2,2'-bis(3,1-benzoxazin-4-one),
2,2'-ethylenebis(3,1-benzoxazin-4-one),
2,2'-tetramethylenebis(3,1-benzoxazin-4-one),
2,2'-hexamethylenebis(3,1-benzoxazin-4-one),
2,2'-decamethylenebis(3,1-benzoxazin-4-one),
2,2'-p-phenylenebis(3,1-benzoxazin-4-one),
2,2'-m-phenylenebis(3,1-benzoxazin-4-one),
2,2'-(4,4'-diphenylene)bis(3,1-benzoxazin-4-one),
2,2'-(2,6- or 1,5-naphthalene)bis(3,1-benzoxazin-4-one),
2,2'-(2-methyl-p-phenylene)bis(3,1-benzoxazin-4-one)
2,2'-(2-nitro-p-phenylene)bis(3,1-benzoxazin-4-one),
2,2'-(2-chloro-p-phenylene)bis(3,1-benzoxazin-4-one) ,
2,2'-(1,4-cyclohexylene)bis(3,1-benzoxazin-4-one),
N-p-(3,1-benzoxazin-4-on-2-yl)phenyl, 4-(3,1-benzoxazin-4-on-2-yl)phthalimide, and
N-p-(3,1-benzoxazin-4-on-2-yl)benzoyl, 4-(3,1-benzoxazin-4-on-2-yl)aniline.

Advantageously used are the compounds of formula (I), preferably the compounds of formula (I) in which n is 2, especially preferably compounds of the following formula:

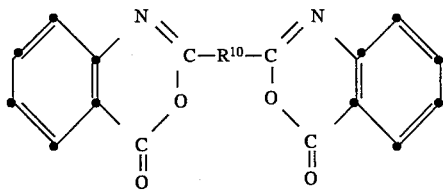

wherein $R^{10}$ represents a divalent aromatic hydrocarbon residue.

Particularly preferred compounds of formula I include 2,2'-p-[phenylene-bis(3,1-benzoxazin-4-one), 2,2'-(4,4'-diphenylene)-bis(3,1-benzoxazin-4-one), and 2,2'-(2,6-naphthalene)bis(3,1-benzoxazin-4-one) are especially preferred. The compound, 2,2'-P-(phenylene)-bis(3,1-benzoxazin-4-one), is even more preferred.

The polyesters useful in the blend of this invention have repeat units from at least 95 mole % of terephthalic acid, at least 99 mole % to 50 mole % ethylene glycol, preferably 99 to 60 mole %, and more preferably 95 to 65 mole % even more preferably 90 to 65 mole %, and from 1 mole % to 50 mole % 1,4-cyclohexandimethanol, preferably 1 to 40 mole %, more preferably, 5–35 mole %, and even more preferably, 10–35 mole %, based on 100 mole percent dicarboxylic acid and 100 mole percent diol.

The polyester preferably have a weight average molecular weight of 35,000 to 75,000, preferably 40,000 to 60,000.

The polyester resins useful in the blend of this invention are well known and are commercially available. Methods for their preparation are described, for example, in U.S. Pat. Nos. 2,465,319 and 3,047,539.

The dicarboxylic acid component may contain up to about 5 mole % of one or more different dicarboxylic acids other than terephthalic acid, or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from one or more of the above dicarboxylic acids.

It should be understood that use of the corresponding acid anhydrides, esters, and acid chlorides of these acids is included in the term "dicarboxylic acid".

In addition, the copolyester may optionally be modified with up to 10 mole percent, preferably up to 5 mole percent, of one or more different diols other than 1,4-cyclohexandimethanol. Such additional diols include cycloaliphatic diols preferably having 6 to 20 carbon atoms or aliphatic diols preferably having 3 to 20 carbon atoms. Examples of such diols to be included with ethylene glycol and diethylene glycol are: triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Copolyesters may be prepared from two or more of the above diols.

The polyesters of the invention preferably have an inherent viscosity of 0.4 to 1.5 dL/g, preferably 0.5 to 0.9 dL/g. Copolyesters containing substantially only ethylene glycol, 1,4-cyclohexanedimethanol and terephthalic acid are preferred.

The preferred range of concentration of UV absorbing compound in the blend is from 1 to 20 weight % based on the total weight of the blend. A more preferable range of the use of the UV absorbing compound is 1.5 to 15 weight % with an even more preferred range of from 2 to 10 weight %. These levels give an unexpected increase in the retention of impact properties of the copolymer sheeting when used in specific 1,4-cyclohenedimethanol ranges for the polyester copolymer as specified below.

The desired level of UV absorbing compound may be arrived at by suitable blending and/or mixing technology such as by preparation of a concentrate of the UV absorbing compound in a base copolymer followed by pellet blending of said concentrate with further copolyester pellets containing no UV absorber such that the final extruded product will be the copolyester with the desired overall level Of UV absorber. Such a mixture containing the UV absorbing compound may then by suitable means be placed as the layer onto the plastic sheeting or film to be stabilized, said layer facing the light exposure making a protective layer from the effects of UV exposure. This results in a sheet or film structure that is protected from the harmful effects of UV exposure both with respect to the yellowing of the same and also property loss upon exposure for the structure. It is obvious that this layer can also be on both sides of the sheet or film either for purposes of attenuating the effect of reflected radiation in a particular application environment or to render installation of the product foolproof. Suitable means for application of this protective layer include, but are not limited to, coextrusion, extrusion coating, extrusion lamination, calendaring, solvent coating, etc.

The polyesters or copolyesters, of the blends of the invention are suitable for use in both the protective layer and the layer of film or sheeting to which the protective layer is applied. Such copolymers have numerous advantages in fabrication over the homopolymers as will be illustrated. But in addition, they also exhibit a stabilization for color and impact retention of the exposed sheeting not present outside of this range to the same degree.

It is obvious that the coating or coextruded protective layer of the film or sheeting need not be of the same copolyester composition which does not contain the UV absorbing compound. Thus, for example, a protective layer based on a copolymer of PET containing 31 mol % of moieties derived from CHDM could be mixed with the UV absorbing compound, for example 2,2'-(1,4 -phenylene)bis-4H-3,1-benzoxazin-4-one, which is coextruded onto a much thicker layer of PET containing 12 mol % moieties derived from CHDM. The protective layer need not have more CHDM present in the base copolyester than the CHDM content of the copolyester used for the bulk of the structure.

Thickness of the protective layer on the underlying film or sheeting can vary according to the desired technological ends of said coating. This protective layer thickness will be governed by the concentration of UV absorber present and must be sufficient to absorb at least 90% of the harmful UV light prior to it reaching the underlying, unmixed copolyester. More preferably the protective layer should absorb 99% of the harmful UV radiation and even more preferably 99.9% thereof prior to it reaching the underlying material. As a general rule, using the UV absorber levels necessary for the practice of this invention, this protective layer need only e ca. 1 mil in thickness in order to screen 99% of the incoming UV light in solar radiation. Obviously this minimum thickness can be further reduced by higher concentration of the UV absorber in the protective layer. One must, however, be certain that this minimum thickness is present in the final part. Thus if a sheet is thermoformed to make the final desired part, the protective layer thickness must be this minimum even where said layer has been thinned out by the drawing down in the thermoforming process.

It has been reported previously (Marcotte, Campbell, Cleaveland, and Turner, J. Polym. Sci., A1, 5, 481–501 (1967)) that a wavelength of 313 nm (nanometers) is the wavelength in the ultraviolet that causes maximum damage to polyesters. Other authors (Hirt, Searle and Schmitt, SPE Trans. 1, 1 (1961)) claim the wavelength of maximum damage to be 325 nm. In either event, one ought to be able to examine the absorbance of a UV absorbing compound at one or both of these wavelengths to determine whether it will be suitable to protect the copolyester sheeting. In this invention, it can be seen that these factors surprisingly do not predict the combination of color and property retention upon stabilization observed for the benzoxazinone stabilizer in combination with a PET copolyester with a specific range of 1,4-cyclohexanedimethanol modification.

The structure of the coextruded product can be a film or a solid sheet or can also be a profile with a UV absorber containing layer depending upon the final use of the stabilized structure. It can also be a hollow profile such as would be made by extruding two sheets of say 30 mils thickness that are connected at angles or even right angles with ribbing running the length of the sheeting. This ribbing would be spaced so as to give structural stiffness to the final structure that would otherwise not be present with the 2 sheets of 30 mil film combined. The ribbing would make continuous channels down the length of the structure making it hollow and having a channel cross-section of a square, for example, between each of the adjacent set of vertical ribs. Many other configurations of such structures are, of course, possible, such as having three or more layers of the sheeting connected by ribbing of various geometries are, of course, also possible. The essential element of such structures is that they provide a great deal of rigidity of the final structure compared to the weight of the polymer employed therein. In these cases, the UV absorber containing layer is placed on either one side or both flat sides just the same as if it were a solid sheet.

Representative applications are for example; signs for businesses, both stationary mounted and also portable ones, luggage carriers for the tops of the vehicles, sign boards, marquees on stores, solar roof panels, skylights, highway sound barriers, greenhouse panels, both in the sidewalls and the roofing thereof, separation walls in aquariums, aquariums themselves, recreational vehicle windows and vents, snowmobile, jet ski, golf cart, motorcycle and other such recreation vehicle windshields, bug screens or air deflection screens on cars and trucks or other such vehicles, transparent or translucent awnings, formed letters to be applied to the sides of buildings, letters to be used on signs, particularly those where the letters are changed at some frequency to change what the sign says, airport runway and taxiway marker signs, multiwall sheeting for use in signs, greenhouses, glazing applications and fluorescent or other light covers, etc., facia for soft drink and juice dispensing machines, etc. In these applications the product can be used either as a clear plastic part or it could be colored via producer added colors to give a clear, colored sheet or it could be printed on the back surface, in particular for sign and marquee applications to give the desired effects of highlighting letters, for example. This list is not intended to be all inclusive but merely representative of the vast number of applications available for a material having suitable properties.

For the Examples hereinbelow, the following procedures were followed:

Samples are cut from the sheeting produced 6.35 by 14.0 cm (2.5 by 5.5 inch samples) and then exposed in a xenon arc Weatherometer at 0.35 W/m² flux, using inner and outer borosilicate filters for the lamp, 55% relative humidity, 63° C. black panel temperature, 18 minutes water spray cycle out of every 2 hours irradiation. Samples are removed at 800 kJ (Kilojoules) increments and tested for color and impact retention. Samples are cut from the sheeting produced into 3 by 4 in panels and exposed in a Uvcon test device sold (Atlas Devices, Inc.) using FS-40 bulbs with a black panel temperature of 70° C. and a condensation cycle temperature of 40° C. The device was run on a cycle of 8 hours of having the lamps on followed by 4 hours of condensation having the lamps off. Samples were tested at 96 hour continuous increments of exposure counting the condensation time as exposure time also. Yellow color in the specimens is measured in a HunterLab Ultrascan color device, sold by Hunter Lab, Inc., under CIE recommendations for obtaining L*, a* and b* values. The b* value was reported, a positive b* value being yellow, the more positive the more yellow. Impact strength was determined by cutting 1.27 cm (0.5 inch) wide by 6.35 cm (2.5 inch) length bars and impacting them according to the ASTM D256 method for Izod testing except that the test specimen was oriented 90° to the normal Izod method, i.e., the hammer strikes the 1.27 cm (0.5 inch) wide face of the specimen rather than the edge of the sheet. Impact strength, unless otherwise specified, was carried out with the exposed surface being struck by the hammer, which puts the front surface into tension.

Thermoforming of extruded sheeting was done with a thermoforms specifically a Hydrotrim Labform IIC 1620/2024. The sheet, 30.5 by 30.5 cm (12 by 12 in.), was clamped leaving a large enough area to form over an approximately 8.5 by 10 in. area, single cavity female mold of a food tray with approximately 1.5 in. draw depth. The bottom of the tray was about 3.375 by 5.75 in. Sheet temperature was measured by an infrared gun mounted on the thermoforming machine. The sheet was heated in the oven (heaters top and bottom) for the indicated time, withdrawn to position over the mold, which took 3 sec., and forming carried out for 8 sec. The mold temperature was held at about 75° F. (18° C.). Haze of the final part after cooling was estimated visually.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

Example 1

This example illustrates the necessity of having a minimum level of UV absorbing compound in the copolyester structure for impact retention. Coextruded structures are made using PET modified with 31 mol % CHDM as both the main layer and also the protective layer. The total thickness of the sheet was maintained at 100 mil and the protective layer was coextruded onto the unmodified layer of the copolymer to give a 15 to 20 mil thick protective layer structure. The UV absorber in the protective layer was varied from 1.0 to 1.8 and 3.2 wt %. The results of 1536 hr total exposure time in a Uvcon device gave the following:

| UV absorber level | change in b* | change in impact strength, % |
|---|---|---|
| 0 | 12.12 | −97.5 |
| 0.6 | 5.70 | −98.4 |
| 1.0 | 4.72 | −89.7 |
| 1.8 | 3.31 | −8.3 |
| 3.2 | 2.08 | −3.4 |

It is clear that the relationship of impact strength to UV absorber level takes a sudden and therefore unexpected jump between the 1.0 and 1.8 weight % samples of UV absorber that one would not have anticipated when examining the change in color (b* value) data. From the b* data one would have instead anticipated a jump in impact retention between 0 and 0.6 weight % absorber and a much slower rate of change from there on upward in absorber concentration.

Example 2

This example illustrates the unexpected stabilization of impact strength of a copolyester containing the UV absorber (Type 2 below) of this invention. Sheeting samples are prepared using the following UV absorbers: Type 1) 2-(2'-hydroxy-5'-t-octyphenyl)benzotriazole and Type 2) 2,2'-(1,4-phenylene)bis-4H-3,1-benzoxazin-4-one. The sheeting is prepared with a protective layer as in the example above. The sheeting is exposed in the Weatherometer for 800 and 1600 kilojoules (kJ) with the following results:

| UV absorber | | change in impact, % | change in impact, % |
|---|---|---|---|
| Type | wt. % | 800 kJ exposure | 1600 kJ exposure |
| 1 | 1.8 | −96.4 | −96.9 |
| 1 | 3.2 | −93.4 | −95.5 |
| 2 | 1.8 | −4.4 | −11.3 |

The sample prepared with the benzoxazinone absorber (Type 2) has thus retained useful properties whereas the ones prepared with the benzotriazole absorber (Type 1) have not. The penetration depth of UV light with these two absorbers is as follows:

| UV absorber | | penetration depth (mils) | penetration depth (mils) |
|---|---|---|---|
| Type | wt. % | 313 nm | 325 nm |
| 1 | 1.8 | 0.91 | 0.82 |
| 1 | 3.2 | 0.51 | 0.46 |
| 2 | 1.8 | 0.41 | 0.46 |

Thus, for the second and third samples of the example, the penetration depths are essentially equal which should typically mean that the impact retention would be pretty much equal assuming that either the 313 nanometers (nm) or 325 nm wavelength were the most damaging as reported. This is clearly not the case. Therefore, the results with the benzoxazinone are unexpected.

Example 3

This example illustrates the unexpected effect of the CHDM level in the copolymer on the ability of the UV absorber to control color development of the copolymer sheeting. For this example, sheeting was prepared using 1.0 wt % 2,2'-(1,4-phenylene) bis-4H-3,1-benzoxazin-4-one as the UV absorbing agent but now melt blended with the sheeting to give a uniform dispersion throughout the sheet. The copolymer composition was varied from 0 mol % CHDM (PET homopolymer) to 62 mol % CHDM. Samples were exposed in the UVcon for 480 hrs and then tested. The results were as follows:

| CHDM level, mol % | UV absorber, wt % | change in b* 288 h/480 h | impact strength* change % |
|---|---|---|---|
| 0 | 0 | 0.15/0.17 | 97.0 |
| 0 | 1.0 | 0.34/0.18 | 18.7 |

| CHDM level, mol % | UV absorber, wt % | change in b* 288 h/480 h | impact strength* change % |
|---|---|---|---|
| 1.5 | 0 | 4.14/4.30 | 96.8 |
| 1.5 | 1.0 | 0.54/0.45 | 4.4 |
| 3.5 | 0 | 2.67/3.05 | 98.0 |
| 3.5 | 1.0 | 0.98/0.70 | 43.4 |
| 12 | 1.0 | 0.91/1.26 | 31.8 |
| 31 | 0 | 7.12/9.54 | 96.5 |
| 31 | 1.0 | 3.30/3.22 | 5.6 |
| 62 | 1.0 | 4.43/5.84 | 3.4 |

*at 480 hour exposure

It is clear from the data that the b* value for the 62 mol % level copolyester is continuing to increase between the 288 hr and 480 hr data points whereas the other stabilized copolymers have leveled off between those two points. This renders the 62 mol % copolyester unusable as compared to the other copolymers.

Example 4

This example shows a further property that causes the restriction of the copolyester content to 10 mol % or more of CHDM. Sheet samples were thermoformed with the following results:

| CHDM level, mol % | absorber, wt % | UV temp, °C. | Sheet appearance | Sheet part definition |
|---|---|---|---|---|
| 0 | 0 | 153.4 | hazy | good |
| 0 | 1.0 | 152.5 | hazy | good |
| 1.5 | 0 | 148.8 | hazy | good |
| 1.5 | 1.0 | 146.8 | hazy | good |
| 3.5 | 0 | 150.7 | hazy | good |
| 3.5 | 1.0 | 151.6 | hazy | good |
| 12 | 1.0 | 141.2 | clear | excellent |
| 31 | 0 | 152.7 | clear | excellent |
| 31 | 1.0 | 148.1 | clear | excellent |
| 62 | 1.0 | 148.7 | clear | good |

Clearly, the copolyesters with less than 10 mol % CHDM content are not suitable to make thermoformed parts which restricts their utility for many outdoor uses.

Although thinner sheeting would give better results, i.e., less tendency to become hazy during thermoforming for the parts made from the copolyesters with levels of CHDM below 10 mol %, for the greatest utility in useful commercial practice, sheeting needs to be made at generally no less than 80 mils in thickness and quite often 93 to 118 mils and even as high as 177 or 232 mils in thickness in order to be suitable from other standpoints such as overall mechanical stiffness in a sign, for example.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A photo-stabilized polymer blend comprising:
   (a) at least one polyethylene terephthalate-based copolymer comprising 1,4-cyclohexane-dimethanol, and
   (b) an ultraviolet absorber, at least one compound selected from the group consisting of cyclic imino esters represented by the following formula (I)

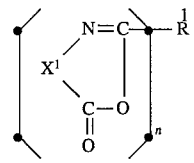

wherein $X^1$ represents 1,2-phenylene, 1,2-naphthylene, 2,3-naphthylene, a group represented by the formula (a)

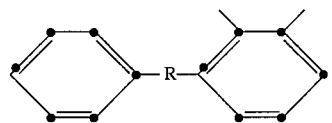

wherein R is —O—, —CO—, —S—, —SO$_2$—, —CH$_2$—, —(CH$_2$)$_2$— or —C(CH$_3$)$_2$—, or a group represented by the formula (b)

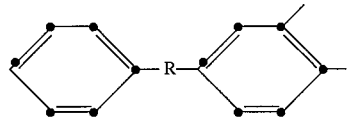

wherein R is as defined above, and n is 1, 2 or 3, and $R^1$ represents a hydrocarbon residue having a valence of n.

2. The blend of claim 1 wherein said ultraviolet absorber comprises at least one compound of formula (I), and $R^1$ is an aromatic hydrocarbon residue having a valence of n.

3. The blend of claim 2 wherein said $R^1$ is an aromatic hydrocarbon residue having a valence where n is 2.

4. The blend of claim 3 wherein said divalent aromatic hydrocarbon residue is phenylene residue.

5. The blend of claim 4 wherein said divalent aromatic hydrocarbon residue is 1,4-phenylene residue.

6. The blend of claim 1 wherein said ultraviolet absorber comprises at least one compound of the formula:

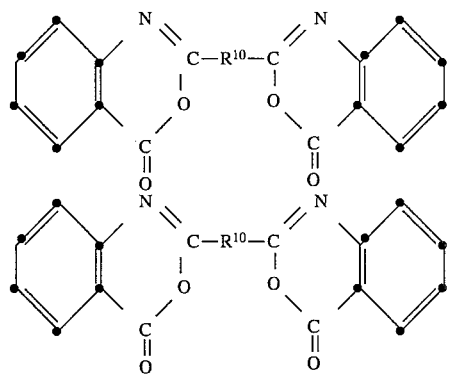

wherein $R^{10}$ represents a divalent aromatic hydrocarbon residue.

7. The blend of claim 6 wherein said divalent aromatic hydrocarbon residue is phenylene residue.

8. The blend of claim 7 wherein said divalent aromatic hydrocarbon residue is 1,4-phenylene residue.

9. The blend of claim 1 wherein said ultraviolet absorber is present in said blend in the amount of from 1.0 to 20.0 weight %, based on the total weight of the blend.

10. The blend of claim 9 wherein said ultraviolet absorber is present in said blend in the amount of 1.5 to 15.0 weight %.

11. The blend of claim 10 wherein said ultraviolet absorber is present in said blend in the amount of 2 to 10.0 weight %.

12. The blend of claim 1 wherein said 1,4-cyclohexanedimethanol component of said copolymer is present in the amount of 1 to 50 mole % based on the mole percentages of the components of said copolymer being equal to 100 mole %.

13. The blend of claim 12 wherein said 1,4-cyclohexanedimethanol is present in said copolymer in the amount of 1 to 40 mole %.

14. The blend of claim 12 wherein said 1,4-cyclohexanedimethanol is present in said copolymer in the amount of 5 to 35 mole %.

15. The blend of claim 12 wherein said copolymer has repeat units from at least 95 mole % of terephthalic acid, at least 99 mole % to 50 mole % ethylene glycol and 1 to 50 mole % 1,4-cyclohexanedimethanol, based on 100 mole percent dicarboxylic acid and 100 mole percent diol.

16. The blend of claim 1 wherein said copolymer has a weight average molecular weight of 35,000 to 75,000.

17. The blend of claim 1 wherein said copolymer has an inherent viscosity of 0.4 to 1.5 dL/g.

18. The blend of claim 16 wherein said copolymer has an inherent viscosity of 0.5 to 0.9 dL/g.

\* \* \* \* \*

UNITED STATES PATENT AND TRADEMARK OFFICE
CERTIFICATE OF CORRECTION

PATENT NO. : 5,480,926
DATED : January 2, 1996
INVENTOR(S) : Fagerburg et al

It is certified that error appears in the above-indentified patent and that said Letters Patent is hereby corrected as shown below:

Column 12, lines 45 - 60 (Claim 6) should be the following structure:

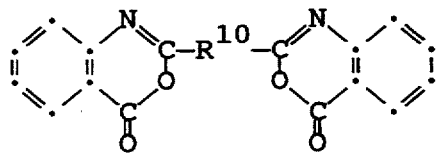

Signed and Sealed this

Twelfth Day of March, 1996

Attest:

BRUCE LEHMAN

Attesting Officer

Commissioner of Patents and Trademarks